(12) United States Patent
Doettling et al.

(10) Patent No.: US 8,755,299 B2
(45) Date of Patent: Jun. 17, 2014

(54) SELF-ORGANIZING NETWORK RELATED POWER CAPACITY STATUS REPORTING

(75) Inventors: Martin Doettling, Neubiberg (DE); Juergen Michel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 218 days.

(21) Appl. No.: 13/389,467

(22) PCT Filed: Aug. 10, 2009

(86) PCT No.: PCT/EP2009/060327
§ 371 (c)(1),
(2), (4) Date: Mar. 20, 2012

(87) PCT Pub. No.: WO2011/018104
PCT Pub. Date: Feb. 17, 2011

(65) Prior Publication Data
US 2012/0170478 A1    Jul. 5, 2012

(51) Int. Cl.
*H04W 4/00*     (2009.01)
*H04W 24/10*    (2009.01)
*H04W 52/02*    (2009.01)

(52) U.S. Cl.
USPC .......................................... 370/252; 370/311

(58) Field of Classification Search
CPC combination set(s) only.
See application file for complete search history.

(56) References Cited

U.S. PATENT DOCUMENTS

| | | | |
|---|---|---|---|
| 6,072,784 A | 6/2000 | Agrawal et al. | 370/311 |
| 7,924,758 B2 * | 4/2011 | Park et al. | 370/311 |
| 2008/0075028 A1 * | 3/2008 | Park et al. | 370/311 |
| 2008/0160918 A1 * | 7/2008 | Jeong et al. | 455/67.11 |
| 2009/1175237 * | 12/2010 | Mach | 455/436 |
| 2010/0311421 A1 * | 12/2010 | Mach | 455/436 |
| 2010/0317378 A1 * | 12/2010 | Fang et al. | 455/466 |
| 2012/0028661 A1 * | 2/2012 | Fang et al. | 455/466 |

FOREIGN PATENT DOCUMENTS

| | | |
|---|---|---|
| EP | 1 679 914 A1 | 7/2006 |
| WO | WO 2008/087535 A2 | 7/2008 |

OTHER PUBLICATIONS

3GPP TR 36.902 V1.2.0 (May 2009), "3rd Generation Partnership Project; Technical specification Group Radio Access Network; Evolved Universal Terrestrial Radio Access Network (E-UTRAN); Self-configuring and Self-optimizing Network Use Cases and Solutions (Release 9)", 26 pgs.

* cited by examiner

*Primary Examiner* — Chi Pham
*Assistant Examiner* — Soon-Dong D Hyun
(74) *Attorney, Agent, or Firm* — Harrington & Smith (57) ABSTRACT

Provided is an apparatus, method, system and computer program product directed to a self-organizing network related power capacity status reporting. A threshold value is set and provided for distribution to communication terminals, wherein the threshold value is related to a relative value concerning the availability of remaining power at a communication terminal. Provision of the threshold to the communication terminals is commanded, and a power report from the communication terminals is also commanded, if the relative value concerning the availability of remaining power at a communication terminal is above the threshold value. Eventually, a measurement report of those communication terminals is commanded, which have reported a relative value concerning the availability of remaining power above the threshold value, wherein this commanding includes an instruction to conduct and report measurements related to the self organization of a communication network in which a communication terminal is connected.

20 Claims, 5 Drawing Sheets

| Setting Threshold Value (RAT) | 21a |

Fig. 3A

| Setting Threshold Value (RAT + Service Class) | 21b |

Fig. 3B

| Arranging DRX Setting | 25 |

SELF-ORGANIZING NETWORK RELATED POWER CAPACITY STATUS REPORTING

FIELD OF THE INVENTION

The present invention relates to an apparatus, method, system and computer program product directed to a self-organizing network related power capacity status reporting.

RELATED BACKGROUND ART

Related background art to this technical field can e.g. be found in the technical specification TR 36.902 current version: 1.2.0) of the 3GPP.

The following meanings for the abbreviations used in this specification apply:
3GPP: $3^{rd}$ Generation Partnership Project
DRX: Discontinuous Reception
eNB: evolved Node B (eNodeB)
GPS: Global Positioning System
GSM: Global System for Mobile Communication
LTE: Long-Term Evolution
OAM: Operation and Maintenance
RRC: Radio Resource Control
SON: Self-Organizing Networks
UE: User Equipment
UMTS: Universal Mobile Telecommunications System
WiMAX: Worldwide Interoperability for Microwave Access
WLAN: Wireless Local Area Network In current network operation and management evolution, there is a trend to simplify manual tasks by auto-configuration and auto-optimization solutions due to its high potential to save operational expenditures.

In parallel thereto, in standardization self-organizing networks (SON) are seen as one of the most promising future areas for similar reasons.

The main drivers for SON are:
 The number and structure of network parameters have become large and configuration complex due to parameter dependencies;
 The quick evolution of wireless networks has led to parallel and heterogeneous operation of infrastructures of the second and third generation of wireless communication networks; and
 The rapidly expanding number of base stations with new deployment strategies (uncoordinated, heterogeneous) needs to be configured and managed economically.

In summary, SON aims to configure and optimize the network automatically, so that the interaction of humans can be reduced and the capacity of the network can be increased.

A promising candidate for maximizing the total performance of networks by applying SON as part of the 3GPP LTE technology is a more efficient operation and maintenance. That is, by simplifying operational tasks through automated mechanisms such as self-configuration and self-optimization, the costs of installation and management can be reduced, thus leading to an improved OAM.

SUMMARY OF THE INVENTION

It is thus an object of the present invention to provide a contribution to self-organizing networks.

According to a first aspect of the present invention, this is accomplished by an apparatus, comprising setting means configured to set a threshold value and to provide the threshold value for distribution to communication terminals, wherein the threshold value is related to a relative value concerning the availability of remaining power at a communication terminal; power report instructing means configured to command a power report of the communication terminals, wherein this power report command includes the threshold value and an instruction to report if the relative value concerning the availability of remaining power at a communication terminal is above the threshold value; and measurement report instructing means configured to command a measurement report of those of the communication terminals, which have reported a relative value concerning the availability of remaining power above the threshold value, wherein this measurement report command includes an instruction to conduct and report measurements related to the self organization of a communication network in which a communication terminal is connected.

Modifications of the first aspect may be as follows.

The apparatus according to the first aspect may be configured to be suitable for providing a self-organizing network related power capacity status reporting.

The threshold value may be related to a pair of a relative value concerning the availability of remaining power at a communication terminal and an absolute value of power capacity at the communication terminal.

The pair of a relative value and an absolute value may be one of a group including a ratio of a current battery capacity of the communication terminal to an overall battery capacity of the communication terminal and the overall battery capacity of the communication terminal, a ratio of a current extrapolated stand-by time of the communication terminal to an overall stand-by time of the communication terminal and the overall stand-by time of the communication terminal, and a ratio of a current extrapolated talk time of the communication terminal to an overall talk time of the communication terminal and the overall talk time of the communication terminal.

The setting means may be further configured to set the threshold value in dependency on a radio access technology related to the communication network in which a communication terminal is connected.

The setting means may be further configured to set the threshold value in dependency on a combination of a radio access technology related to the communication network in which a communication terminal is connected and a communication service class in which the communication terminal is currently configured to operate.

The measurement report instructing means may be further configured to determine if there is an insufficient number of reported measurements related to the self organization of a communication network, and if yes, to command a measurement report of all of the communication terminals.

The apparatus may further comprise discontinuous reception setting means configured to arrange the setting of discontinuous reception of a communication terminal based on a report of this communication terminal including the relative value concerning the availability of remaining power at the communication terminal.

The apparatus may further comprise controlling means configured to provide and be responsive to a control procedure signaling related to one or more of the group comprising the threshold value, a received measurement report related to the self organization of the communication network, and an insufficient number of reported measurements related to the self organization of the communication network.

According to a second aspect of the present invention, the object is accomplished by an apparatus, comprising a threshold setting processor configured to set a threshold value and to provide the threshold value for distribution to communication terminals, wherein the threshold value is related to a relative value concerning the availability of remaining power at a communication terminal; a power report instructor processor configured to command a power report of the communication terminals, wherein this power report command includes the threshold value and an instruction to report if the relative value concerning the availability of remaining power at a communication terminal is above the threshold value; and a measurement report instructor processor configured to command a measurement report of those of the communication terminals, which have reported a relative value concerning the availability of remaining power above the threshold value, wherein this measurement report command includes an instruction to conduct and report measurements related to the self organization of a communication network in which a communication terminal is connected.

Modifications of the second aspect of the present invention may correspond to the modifications of the first aspect and may particularly include a discontinuous reception setting processor configured to arrange the setting of discontinuous reception of a communication terminal based on a report of this communication terminal including the relative value concerning the availability of remaining power at the communication terminal, and a signaling controller configured to provide and be responsive to a control procedure signaling related to one or more of the group comprising the threshold value, a received measurement report related to the self organization of the communication network, and an insufficient number of reported measurements related to the self organization of the communication network.

According to a third aspect of the present invention, the object is accomplished by an evolved Node B, comprising an apparatus according to the first or second aspect of the present invention or any of their modifications.

According to a fourth aspect of the present invention, the object is accomplished by a central network entity, comprising implemented functionalities related to the self organization of a communication network; and an apparatus according to the first or second aspect of the present invention or any of their modifications.

According to a fifth aspect of the present invention, the object is accomplished by a system comprising the evolved Node B according to the above described third aspect; and a central network entity according to the above described fourth aspect.

According to a sixth aspect of the present invention, the object is accomplished by a method, comprising setting a threshold value and providing the threshold value for distribution to communication terminals, wherein the threshold value is related to a relative value concerning the availability of remaining power at a communication terminal; commanding provision of the threshold to the communication terminals; commanding a power report from the communication terminals, if the relative value concerning the availability of remaining power at a communication terminal is above the threshold value; and commanding a measurement report of those communication terminals, which have reported a relative value concerning the availability of remaining power above the threshold value, wherein this commanding includes an instruction to conduct and report measurements related to the self organization of a communication network in which a communication terminal is connected.

Modifications of the sixth aspect may be as follows.

The method according to the sixth aspect may be suitable for providing a self-organizing network related power capacity status reporting.

The threshold value may be related to a pair of a relative value concerning the availability of remaining power at a communication terminal and an absolute value of power capacity at the communication terminal.

The pair of a relative value and an absolute value may be one of a group including a ratio of a current battery capacity of the communication terminal to an overall battery capacity of the communication terminal and the overall battery capacity of the communication terminal, a ratio of a current extrapolated stand-by time of the communication terminal to an overall stand-by time of the communication terminal and the overall stand-by time of the communication terminal, and a ratio of a current extrapolated talk time of the communication terminal to an overall talk time of the communication terminal and the overall talk time of the communication terminal.

The method may further comprise setting the threshold value in dependency on a radio access technology related to the communication network in which a communication terminal is connected.

The method may further comprise setting the threshold value in dependency on a combination of a radio access technology related to the communication network in which a communication terminal is connected and a communication service class in which the communication terminal is currently configured to operate.

The method may further comprise determining an insufficient number of reported measurements related to the self organization of a communication network; and commanding a measurement report of all communication terminals.

The method may further comprise arranging the setting of discontinuous reception of a communication terminal based on a report of this communication terminal including the relative value concerning the availability of remaining power at the communication terminal.

The method may further comprise executing a control procedure signaling related to one or more of the group comprising the threshold value, a received measurement report related to the self organization of the communication network, and an insufficient number of reported measurements related to the self organization of the communication network.

According to a seventh aspect of the present invention, the object is accomplished by a computer program product comprising computer-executable components which perform, when the program is run on a computer setting a threshold value and providing the threshold value for distribution to communication terminals, wherein the threshold value is related to a relative value concerning the availability of remaining power at a communication terminal; commanding provision of the threshold to the communication terminals; commanding a power report from the communication terminals, if the relative value concerning the availability of remaining power at a communication terminal is above the threshold value; and commanding a measurement report of those communication terminals, which have reported a relative value concerning the availability of remaining power above the threshold value, wherein this commanding includes an instruction to conduct and report measurements related to the self organization of a communication network in which a communication terminal is connected.

Modifications of the seventh aspect may be as follows.

The computer program product according to the seventh aspect may be suitable for providing a self-organizing network related power capacity status reporting.

The computer program product according to the seventh aspect may be embodied as a computer-readable storage medium.

Otherwise, modifications of the seventh aspect may correspond to the modifications of the sixth aspect.

It is to be understood that any of the above modifications can be applied singly or in combination to the respective aspects to which they refer, unless they are explicitly stated as excluding alternatives.

BRIEF DESCRIPTION OF THE DRAWINGS

These and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description will be made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, a self-organizing network related power capacity status reporting in a 3GPP LTE network is described. However, it should be appreciated that these exemplary embodiments are not limited for use among this particular type of wireless communication system, and according to further exemplary embodiments, the present invention can be applied also to self-organizing network related power capacity status reporting in other types of fixed or wireless communication systems and access networks such as e.g. to WLAN (wireless local area network) and WIMAX (worldwide interoperability for microwave access) techniques and standards.

Thus, according to certain embodiments of the present invention, an apparatus, method, system and computer program product for providing a self-organizing network related power capacity status reporting is described. Implementation examples of certain embodiments of the present invention are related to eNB equipment and SON equipment, but are not limited thereto. The self-organization of networks may be related to radio access networks.

In operation and management, a typical task is to optimize the network according to coverage and capacity, and the traditional way to solve this is by doing manual measurements, performing drive tests and use planning tools to find possible solutions for existing networks like changing antenna tilt settings, beam forming patterns, transmission power configuration or handover margins.

However, according to certain embodiments of the present invention, it is enabled for future network operation and management evolution that the use case of discovering coverage and capacity problems can be performed automatically, and measurements from conventional UEs including UE position (e.g. by utilizing UE integrated GPS module) and UE received signal strength and quality can be used instead of measurements from dedicated measurement equipment which was conventionally used in costly manual drive test campaigns.

According to certain embodiments of the present invention this is achieved by circumventing the problem that additional UE measurements increase the UE battery consumption, especially if measurement cycles contradict with the UE sleep mode which reduces UE standby and talk time, which in turn are key factors influencing the user satisfaction.

Therefore, according to certain embodiments of the present invention, knowledge is made available in certain entities such as eNB and/or SON equipment (but not limited thereto) about the remaining battery capacity, standby or talk time of the user terminals. Thus, an additional battery drain due to SON measurements can be prevented.

Furthermore, it is to be understood that according to certain embodiments of the present invention, an implementation may be completely done in an evolved Node B, while according to other certain embodiments of the present invention, an implementation may be completely done in a central network entity such as a SON entity. In the latter case any interaction with communication terminals such as UE might possibly nevertheless be effected via an eNB, and/or optional features might be implemented in the eNB. Further implementation examples may involve still other network elements. Also any distributed implementation involving one or more of the above identified network elements is within the embodiments of the present invention.

It is to be noted that for the purposes of explaining the present invention, the term "battery" is used to illustrate the example of a mobile terminal in a wireless communication network. However, the present invention is not limited thereto, and the term "battery" is intended to designate the physical power source of a terminal such as e.g. user equipment. So far as for any reason the power to be provided by such source is limited, e.g. needs to be refreshed and/or refilled after consumption, the term "capacity" is meant to designate a current amount of available power.

Figure 1:
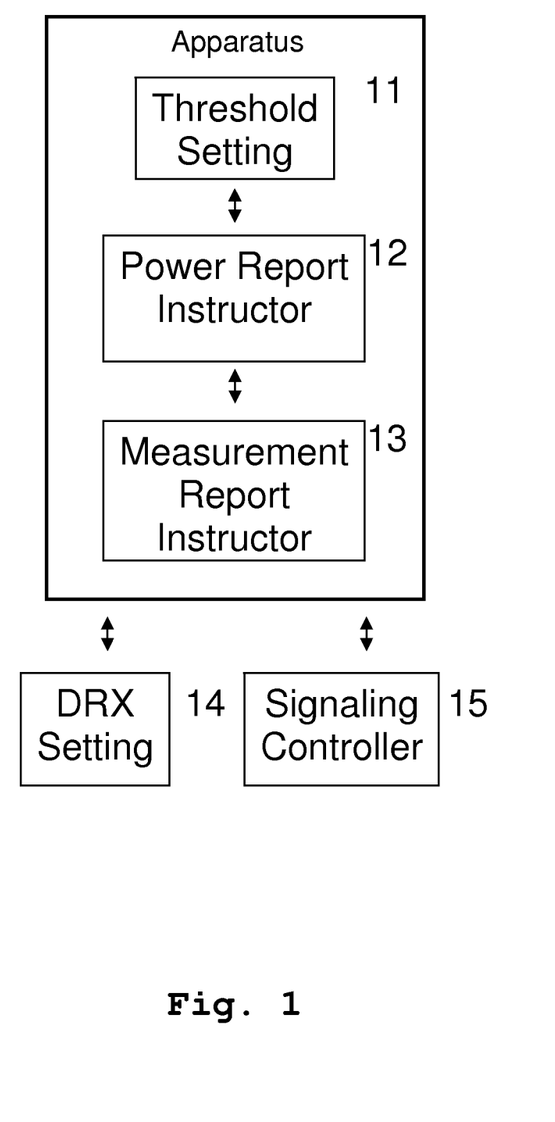
FIG. 1 shows an apparatus according to certain embodiments of the present invention as well as modifications of this apparatus according to other certain embodiments of the present invention.

FIG. 1 shows a principle configuration of an apparatus according to certain embodiments of the present invention. That is, as shown in FIG. 1, an apparatus comprises a threshold setting processor 11 configured to set a threshold value and to provide the threshold value for distribution to communication terminals. The threshold value is related to a relative value concerning the availability of remaining power at a communication terminal. Further, the apparatus comprises a power report instructor processor 12 configured to command a power report of the communication terminals. This power report command includes the threshold value and an instruction to report if the relative value concerning the availability of remaining power at a communication terminal is above the threshold value. Still further, the apparatus comprises a measurement report instructor processor 13 configured to command a measurement report of those of the communication terminals, which have reported a relative value concerning the availability of remaining power above the threshold value. This measurement report command includes an instruction to conduct and report measurements related to the self organization of a communication network in which a communication terminal is connected.

As modifications of these certain embodiments of the present invention, FIG. 1 shows two exemplary further options according to other certain embodiments of the present invention. Specifically, a discontinuous reception setting processor 14 may further be comprised in the apparatus or provided for operable connection thereto, which is configured to arrange the setting of discontinuous reception of a communication terminal based on a report of this communication terminal including the relative value concerning the availability of remaining power at the communication terminal. In addition or alternatively, the apparatus may comprise a signaling controller 15 configured to provide and be responsive to a control procedure signaling related to one or more of the group comprising the threshold value, a received measurement report related to the self organization of the communication network, and an insufficient number of reported measurements related to the self organization of the communication network. Also the signaling controller 15 may alternatively be provided for a mere operable connection to the apparatus.

Figure 2:
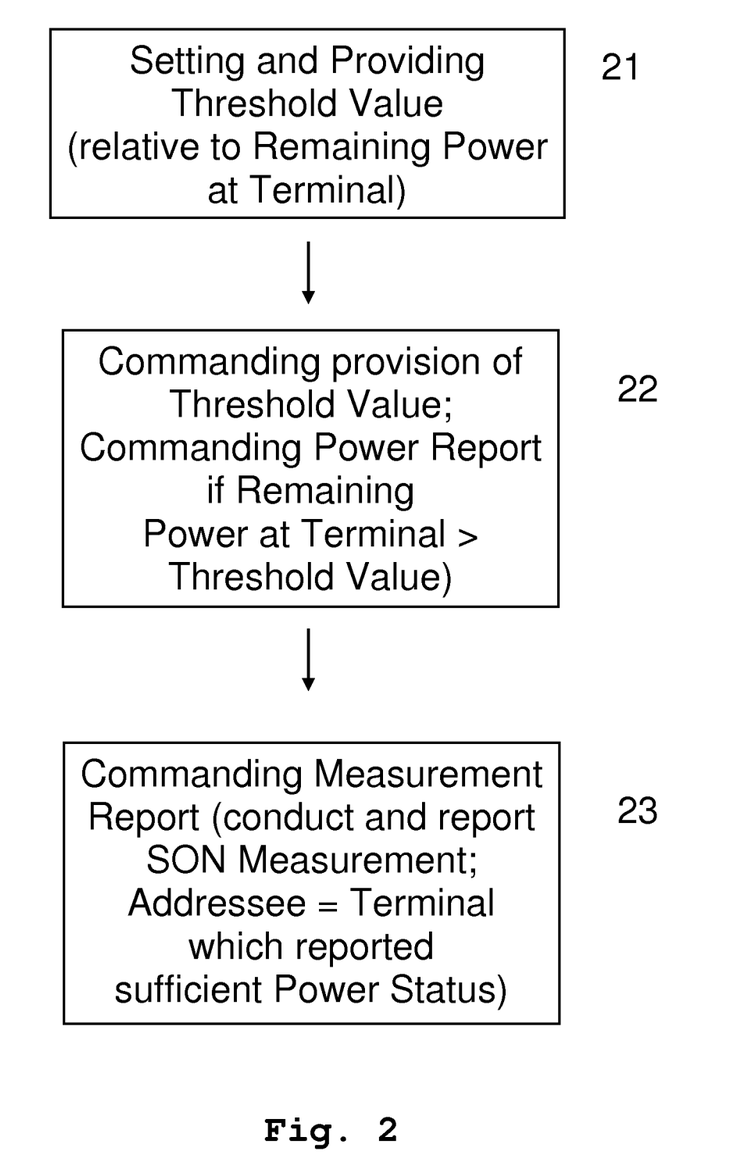
FIG. 2 shows a method according to certain embodiments of the present invention.

FIG. 2 shows a principle flowchart of a method according to certain embodiments of the present invention. That is, as shown in FIG. 2, a method comprises setting 21a threshold value and providing the threshold value for distribution to communication terminals, wherein the threshold value is related to a relative value concerning the availability of remaining power at a communication terminal. The method further comprises commanding 22 provision of the threshold to the communication terminals, and commanding a power report from the communication terminals if the relative value concerning the availability of remaining power at a communication terminal is above the threshold value; and commanding 23 a measurement report of those of the communication terminals, which have reported a relative value concerning the availability of remaining power above the threshold value, wherein this commanding 23 includes an instruction to conduct and report measurements related to the self organization of a communication network in which a communication terminal is connected.

As modifications of the method according to certain embodiments of the present invention illustrated in FIG. 2, the setting and providing of a threshold value 21 may be executed by a threshold setting processor as e.g. shown in FIG. 1. Further, the providing a power report command message 22 may be executed by a power report instructor processor 12 as e.g. shown in FIG. 1. Still further, the providing a measurement report command message 23 may be executed by a measurement report instructor processor 13.

FIGS. 3A to 3E show further modifications of the certain embodiments illustrated in FIG. 2. FIGS. 3A to 3E are to be understood as showing either alternative steps of those shown in FIG. 2, or additional steps to those shown in FIG. 2.

Figure 3A:
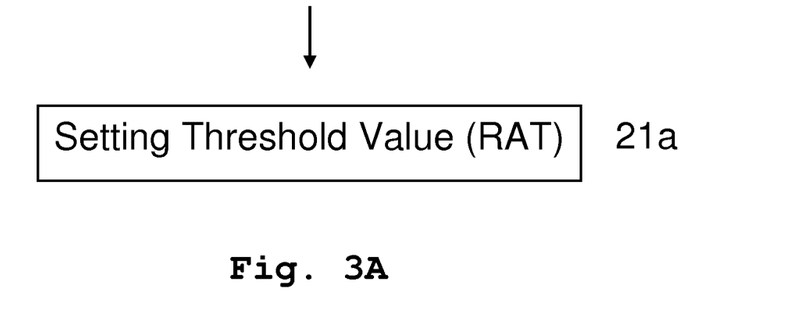
FIGS. 3A to 3E show modifications of the method shown in FIG. 2 according to other certain embodiments of the present invention, wherein the modifications are constituted either by means of alternative or addition.

Specifically, according to FIG. 3A, in certain embodiments of the present invention the setting and providing of a threshold value 21 may be executed such that the threshold value is set 21a in dependency on a radio access technology related to the communication network in which a communication terminal is connected. Also step 21a may be executed e.g. by the threshold setting processor shown in FIG. 1.

Figure 3B:
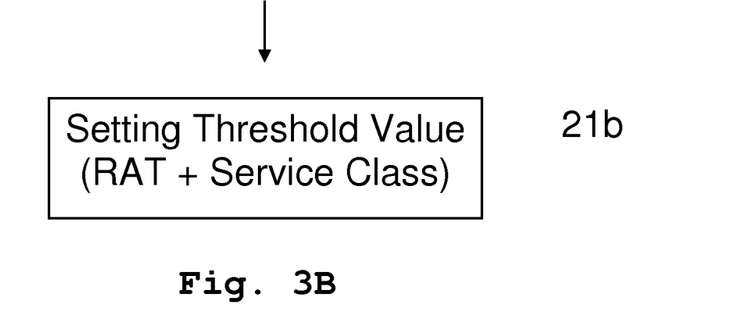

Further, according to FIG. 3B, in certain embodiments of the present invention the setting and providing of a threshold value 21 may be executed such that the threshold value is set 21b in dependency on a combination of a radio access technology related to the communication network in which a communication terminal is connected and a communication service class in which the communication terminal is currently configured to operate. Also step 21b may be executed e.g. by the threshold setting processor shown in FIG. 1. A communication service class may e.g. be voice, interactive data, background service and the like. According to further certain embodiments, the threshold value may also be set only in dependency on the communication service class in which the communication terminal is currently configured to operate.

Figure 3C:
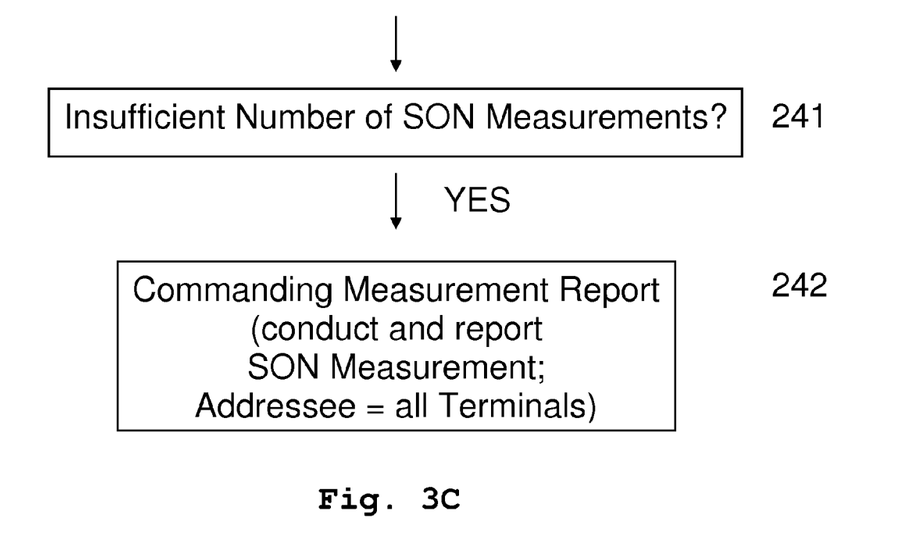

Still further, according to FIG. 3C, in certain embodiments of the present invention it may additionally determined 241 whether there is an insufficient number of reported measurements related to the self organization of a communication network. If not, no further process is executed. If yes, it is further commanded 242 a measurement report of all communication terminals. Further modifications are constituted as the above may e.g. be executed by the measurement report instructor 13 as shown in FIG. 1.

Figure 3D:
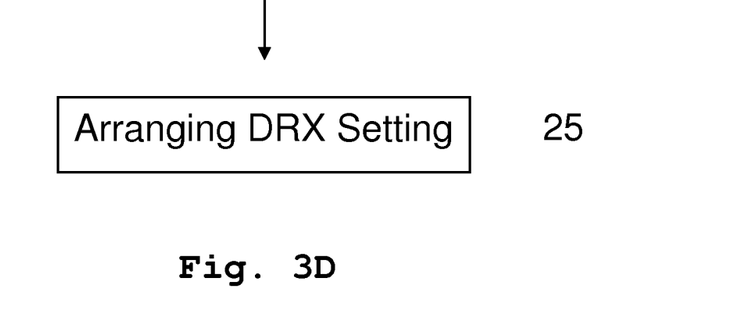

FIG. 3D shows a further modification according to certain embodiments of the present invention with arranging 25 the setting of discontinuous reception of a communication terminal based on a report of this communication terminal including the relative value concerning the availability of remaining power at the communication terminal, which may optionally be executed by a discontinuous reception setting processor 14 as e.g. shown in FIG. 1.

Figure 3E:
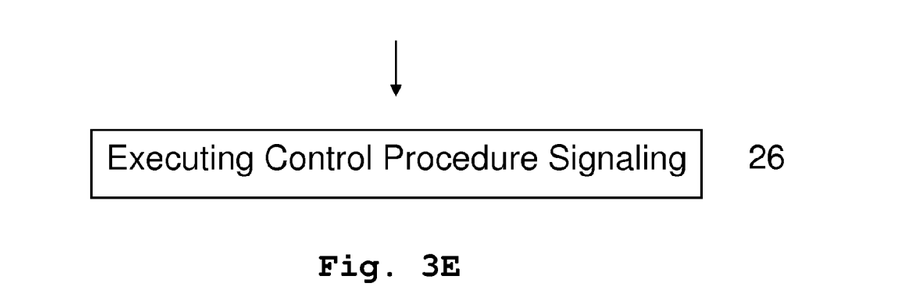

FIG. 3E shows a further modification according to certain embodiments of the present invention with executing 26 a control procedure signaling related to one or more of the group comprising the threshold value, a received measurement report related to the self organization of the communication network, and an insufficient number of reported measurements related to the self organization of the communication network. This may be executed by a signaling controller 15 as e.g. shown in FIG. 1.

According to certain embodiments of the present invention, it can thus be ensured that UE which are already running on low battery capacity are not weakened further by extensively utilizing these UE for SON type measurements.

Figure 4:
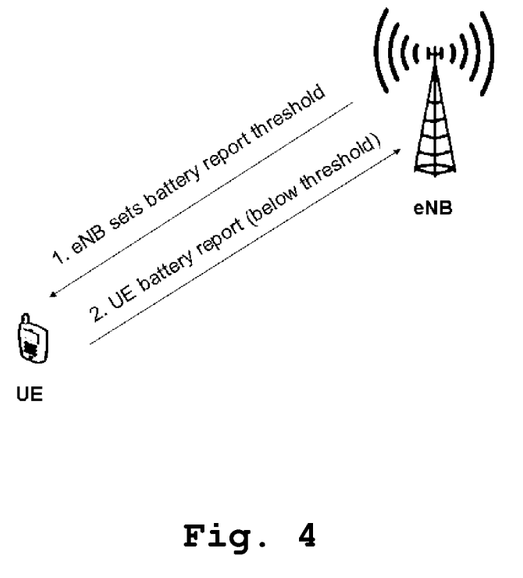
FIG. 4 shows an interaction between an evolved Node B and user equipment as an implementation example according to further certain embodiments.

Referring now to FIG. 4, as further modifications according to certain embodiments of the present invention, there are for example the following implementation examples between a user equipment and an evolved Node B:

The UE can signal a ratio of [current battery capacity]/[overall battery capacity] value and [overall battery capacity] to the eNB.

Alternatively, the UE can signal a ratio of [current extrapolated stand by time]/[overall stand by time] and [overall stand by time] to the eNB.

Still alternatively, the UE can signal a ratio of [current extrapolated talk time]/[overall talk time] and [overall talk time] to the eNB.

According to further certain embodiments, the UE can signal these values RAT specific, which means there is a value (or value pair) signaled e.g. for GSM, UMTS, LTE and/or WLAN.

Further to the above description, according to certain embodiments of the present invention, the network can set a threshold at a UE for each of these values. If the current value at a UE is falling below the threshold, this UE stops to report the above value pair to the eNB. Optionally, it can report again if the current threshold is exceeded again (e.g. due to charging of the battery, or since the eNB has updated the threshold setting). Further specific embodiments include that the UE will not send the above values, but only an indication (flag) that it is above and/or exceeded again the threshold.

In an implementation example of certain embodiments of the present invention, after entering the active state or changing the cell due to mobility, the UE has to evaluate the battery report threshold setting of the new cell and report as described above.

Alternatively or in addition, according to further certain embodiments of the present invention, the eNB might further report the UE battery reports or information based on aggregation and processing of these reports to central SON entities in an OAM system.

Still further embodiments of the present invention comprise one or more of the following implementation features.

Based on the above described signaling, the eNB can maintain a list of UE, which are currently operating on a battery level below the threshold. It can exclude them from SON-type measurements and reporting or at least prioritize other UE for these measurements and reports. Vice versa, the eNB can also maintain a list of UE which are currently operating on a battery level above the threshold. They are included into SON-type measurements and reporting or at least prioritized for these measurements and reports.

Due to the relative definition of the reports, they can be applied to all UE regardless of their absolute battery capacity. Therefore, the threshold can be broadcast in each cell.

In a particular implementation, the UE can report its battery report already in the initial communication during the establishment of a RRC connection or during a handover.

In a further implementation example, only the threshold is broadcast from the eNB and all measurements and reports classified to be non-crucial will only be performed by UE exceeding the threshold. This requires trust in the UE implementation and reports that are sent more or less autonomously, i.e. without the network polling for a particular UE.

In addition to the application to SON-type measurements, the information on the battery status of an UE can be used for optimization of further configurations, such as e.g. the DRX settings for the respective UE.

Certain embodiments of the present invention allow the network to understand the remaining battery capacity of each individual UE. Therefore, it can configure UE-related settings in order to maximize service time and thus user satisfaction. In particular, non-crucial measurements and reports can be avoided such as SON-type measurements.

A particular implementation example of certain embodiments of the present invention includes standardizing the above described procedure and its associated messages between eNB and UE (and eventually also those between eNB and central SON entity).

Besides, the above described feature that power reporting is made when the threshold is exceeded can also be exchanged by a feature that power reporting is made when the threshold is undercut, thus leading to further embodiments. However, the embodiments comprising a power reporting in case of sufficient remaining power are considered to be superior, since also the power reporting consumes further power of the terminal and thus might constitute a drawback.

Further, according to certain embodiments of the present invention, implementation examples are related to LTE eNB, but are not limited thereto.

According to the above description, it should thus be apparent that exemplary embodiments of the present invention provide, for example from the perspective of a network element such as an evolved Node B (eNB), and/or a central network element such as a SON entity, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of providing self-organizing network related power capacity status reporting.

Implementations of any of the above described blocks, apparatuses, systems, techniques or methods include, as non limiting examples, implementations as hardware, software, for example in connection with a digital signal processor, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
one or more processors; and
one or more memories including computer program code, the one or more memories and the computer program code configured, with the one or more processors, to cause the apparatus to perform the following:
setting a threshold value and providing the threshold value for distribution to communication terminals, wherein the threshold value is related to a relative value concerning availability of remaining power at a communication terminal;
commanding a power report of the communication terminals, wherein this power report command includes the threshold value and an instruction to report when the relative value concerning the availability of remaining power at a communication terminal is above the threshold value; and
commanding a measurement report of those of the communication terminals, which have reported a relative value concerning the availability of remaining power above the threshold value, wherein this measurement report command includes an instruction to conduct and report measurements related to self organization of a communication network in which a communication terminal is connected.

2. The apparatus according to claim 1, wherein the threshold value is related to a pair of a relative value concerning the availability of remaining power at a communication terminal and an absolute value of power capacity at the communication terminal.

3. The apparatus according to claim 2, wherein the pair of a relative value and an absolute value is one of a group including a ratio of a current battery capacity of the communication terminal to an overall battery capacity of the communication terminal and the overall battery capacity of the communication terminal, a ratio of a current extrapolated stand-by time of the communication terminal to an overall stand-by time of the communication terminal and the overall stand-by time of the communication terminal, and a ratio of a current extrapolated talk time of the communication terminal to an overall talk time of the communication terminal and the overall talk time of the communication terminal.

4. The apparatus according to claim 2, wherein the one or more memories and the computer program code are further configured, with the one or more processors, to set the threshold value in dependency on a combination of a radio access technology related to the communication network in which a communication terminal is connected and a communication service class in which the communication terminal is currently configured to operate.

5. The apparatus according to claim 1, wherein the one or more memories and the computer program code are further configured, with the one or more processors, to set the threshold value in dependency on a radio access technology related to the communication network in which a communication terminal is connected.

6. The apparatus according to claim 1, wherein the one or more memories and the computer program code are further configured, with the one or more processors, to determine whether there is an insufficient number of reported measurements related to the self organization of a communication network, and, when there is an insufficient number, to command a measurement report of all of the communication terminals.

7. The apparatus according to claim 1, wherein the one or more memories and the computer program code are further configured, with the one or more processors, to arrange the setting of discontinuous reception of a communication terminal based on a report of this communication terminal including the relative value concerning the availability of remaining power at the communication terminal.

8. The apparatus according to claim 1, wherein the one or more memories and the computer program code are further configured, with the one or more processors, to provide and be responsive to a control procedure signaling related to one or more of the group comprising the threshold value, a received measurement report related to the self organization of the communication network, and an insufficient number of reported measurements related to the self organization of the communication network.

9. An evolved Node B comprising an apparatus according to claim 1.

10. A central network entity, comprising implemented functionalities related to the self organization of a communication network; and an apparatus according to claim 1.

11. A system comprising the evolved Node B according to claim 9; and a central network entity according to claim 10.

12. A method comprising:
setting a threshold value and providing the threshold value for distribution to communication terminals, wherein the threshold value is related to a relative value concerning availability of remaining power at a communication terminal;
commanding provision of the threshold value to the communication terminals;
commanding a power report from the communication terminals, when the relative value concerning the availability of remaining power at a communication terminal is above the threshold value; and
commanding a measurement report of those communication terminals, which have reported a relative value concerning the availability of remaining power above the threshold value, wherein this commanding includes an instruction to conduct and report measurements related to self organization of a communication network in which a communication terminal is connected.

13. The method according to claim 12, wherein the threshold value is related to a pair of a relative value concerning the availability of remaining power at a communication terminal and an absolute value of power capacity at the communication terminal.

14. The method according to claim 13, wherein the pair of a relative value and an absolute value is one of a group including a ratio of a current battery capacity of the communication terminal to an overall battery capacity of the communication terminal and the overall battery capacity of the communication terminal, a ratio of a current extrapolated stand-by time of the communication terminal to an overall stand-by time of the communication terminal and the overall stand-by time of the communication terminal, and a ratio of a current extrapolated talk time of the communication terminal to an overall talk time of the communication terminal and the overall talk time of the communication terminal.

15. The method according to claim 13, further comprising:
setting the threshold value in dependency on a combination of a radio access technology related to the communication network in which a communication terminal is connected and a communication service class in which the communication terminal is currently configured to operate.

16. The method according to claim 12, further comprising:
setting the threshold value in dependency on a radio access technology related to the communication network in which a communication terminal is connected.

17. The method according to claim 12, further comprising:
determining an insufficient number of reported measurements related to the self organization of a communication network; and
commanding a measurement report of all communication terminals.

18. The method according to claim 12, further comprising:
arranging the setting of discontinuous reception of a communication terminal based on a report of this communication terminal including the relative value concerning the availability of remaining power at the communication terminal.

19. The method according to claim 12, further comprising:
executing a control procedure signaling related to one or more of the group comprising the threshold value, a received measurement report related to the self organization of the communication network, and an insufficient number of reported measurements related to the self organization of the communication network.

20. A computer program product comprising a non-transitory computer-readable storage medium bearing computer program code embodied therein for use with a computer, the computer program code comprising code for performing the following:
setting a threshold value and providing the threshold value for distribution to communication terminals, wherein the threshold value is related to a relative value concerning availability of remaining power at a communication terminal;
commanding provision of the threshold value to the communication terminals;
commanding a power report from the communication terminals, when the relative value concerning the availability of remaining power at a communication terminal is above the threshold value; and
commanding a measurement report of those communication terminals, which have reported a relative value concerning the availability of remaining power above the threshold value, wherein this commanding includes an instruction to conduct and report measurements related to self organization of a communication network in which a communication terminal is connected.

* * * * *